(12) United States Patent
Chan

(10) Patent No.: US 10,019,024 B2
(45) Date of Patent: Jul. 10, 2018

(54) METHODS AND APPARATUS FOR DETECTING AND CORRECTING INSTABILITIES WITHIN A POWER DISTRIBUTION SYSTEM

(71) Applicant: Mehta Tech, Inc., Eldridge, IA (US)

(72) Inventor: Steve Chan, La Jolla, CA (US)

(73) Assignee: Vit Tall LLC, La Jolla, CA (US)

( * ) Notice: Subject to any disclaimer, the term of this patent is extended or adjusted under 35 U.S.C. 154(b) by 273 days.

(21) Appl. No.: 15/136,201

(22) Filed: Apr. 22, 2016

(65) Prior Publication Data

US 2016/0239034 A1 Aug. 18, 2016

Related U.S. Application Data

(63) Continuation of application No. PCT/US2014/061791, filed on Oct. 22, 2014.

(60) Provisional application No. 61/894,199, filed on Oct. 22, 2013.

(51) Int. Cl.
*G05F 1/66* (2006.01)
*H02J 3/24* (2006.01)
*G05B 15/02* (2006.01)

(52) U.S. Cl.
CPC ............... *G05F 1/66* (2013.01); *G05B 15/02* (2013.01); *H02J 3/24* (2013.01); *Y02E 60/728* (2013.01); *Y02E 60/74* (2013.01); *Y04S 10/265* (2013.01); *Y04S 10/30* (2013.01)

(58) Field of Classification Search
CPC ............... G05F 1/66; G05B 15/02; H02J 3/24
See application file for complete search history.

(56) References Cited

U.S. PATENT DOCUMENTS

| | | | | |
|---|---|---|---|---|
| 2009/0276173 A1* | 11/2009 | Wang | ................ | G01R 19/2513 702/65 |
| 2009/0281679 A1* | 11/2009 | Taft | ........................ | G01D 4/004 700/297 |
| 2011/0082654 A1* | 4/2011 | Dickens | .................... | H02J 3/24 702/60 |
| 2013/0154614 A1* | 6/2013 | Gadiraju | ................... | H02J 3/00 324/103 R |
| 2015/0073735 A1* | 3/2015 | Abido | .................. | G01R 31/088 702/59 |

OTHER PUBLICATIONS

Written Opinion and Search Report from PCT application No. PCT/US2014/061791 dated Jan. 27, 2015.

\* cited by examiner

*Primary Examiner* — Vincent Tran
(74) *Attorney, Agent, or Firm* — Woodard, Emhardt, Moriarty, McNett & Henry LLP

(57) ABSTRACT

Disclosed are methods and apparatus to improve the stability of power distribution systems. The methods and apparatus include using edge processing to decrease the detection and reaction times associated with disturbances within the power distribution system. The edge processor can compare sampled phasor data with center of inertia data associated with the power distribution system.

18 Claims, 3 Drawing Sheets

METHODS AND APPARATUS FOR DETECTING AND CORRECTING INSTABILITIES WITHIN A POWER DISTRIBUTION SYSTEM

CROSS-REFERENCE TO RELATED APPLICATION

This application is a continuation of International Patent Application No. PCT/US2014/061791, filed Oct. 22, 2014 which claims the benefit of U.S. Provisional Application No. 61/894,199 filed Oct. 22, 2013, each of which is hereby incorporated by reference.

BACKGROUND

The present disclosure deals with processes and apparatus for calculating instability within a power distribution system and optionally correcting the instability.

Power distribution systems, also known as electrical power grids, are used to transmit power from power generators to consumers. Over time, power distribution systems have become increasingly complex and more difficult to govern, resulting in their increased instability. This is evidenced by the Northeast Blackout of 2003, as an example.

In addition to the general growth in the complexity of power distribution systems to accommodate greater consumer demand and adapt to growing and changing topologies, several factors to some extent—and are predicted to increasingly—contribute to increased instability in power distribution systems. One such factor is the deregulation of the electrical utility industry. The deregulation of the industry has led to an increased number of power brokers that each services relatively fewer consumers as compared to prior regulatory schemes. This fragmentation of the market leads to increased instability of the electrical power grid by making the transfer of power through different points in the grid less predictable due to power brokers vying for customers and routing power through different pathways in attempting to optimize the price of power delivered to consumers.

Another factor that has significantly impacted the stability of the power grid has been the development of smart appliances and timers. These appliances can be programmed to operate at different times of the day than was previously feasible. This is sometimes to take advantage of lower electricity costs during off hours and sometimes to operate when the users are asleep. The operation of these appliances has made the demand on the power distribution systems less predictable by decreasing demand during peak hours and increasing demand during off hours. Yet another factor is the increased supply of renewable energy in power distribution systems. Many sources of renewable energy, and in particular wind and solar power, cannot provide consistent power generation when compared to coal, gas, and nuclear power plants, thereby creating fluctuations in the supply of power.

Thus, power distribution systems are increasingly being subjected to unpredictable fluctuations in both supply and demand which leads to increased instability.

Instability in power distribution system can come from a variety of sources. As previously discussed, differences in consumer demand and fluctuations in supply due to the use of renewable resources are increasing sources of instability. Additionally, faults in the power distribution system are a common source of instability. Electrical generators used in these systems are generally synchronous and physically large, resulting in several phenomena when they are in operation. First, the generators can act as a generator or as a load depending on the direction of flow of electricity between the rest of the power distribution system and the generator. This phenomenon commonly occurs depending in part on the phase difference of the generator and the rest of the power distribution system. A power distribution system as a whole can generate a much greater amount of power than a single generator. Therefore, if there is a phase difference between one generator and the rest of the system, the generator will attempt to correct itself such that it is synchronized (in phase) with the rest of the power distribution system. The power used to synchronize the generator can flow from the power distribution system and through the generator and therefore heat the wire windings of the generator. If the power required for synchronization is too great, it can lead to catastrophic failures and permanent damage to the generator. Similar results can also occur if any two sections of a power distribution system are significantly out of phase and yet remain interconnected.

Therefore, it is important to synchronize each generator with the rest of the power distribution system. However, this is an over simplified model in that phase of the power distribution system is not perfectly consistent throughout the system. The phase can be altered through the transfer of power through transmission lines, the amount of loading of the system by customer appliances/devices, the changes in the reactance (capacitive or inductive) of the loads, through phase shifting transformers, and through other means. Additionally, the precise phase of an operating generator is currently difficult to ascertain. Although there are plans to directly read the phase using an encoder or other such device, currently the phase of a generator is generally estimated by sensing the phase of electricity in close proximity to the generator.

The relatively large size of generator rotors also makes it difficult to adjust the phase of the generator quickly enough to respond to fluctuations in phase because the generators have a relatively large amount of inertia as they spin. Generally, other mechanisms are therefore used to prevent or correct instability in the system. These can include power shedding, fault clearing, shunt reactors, or other active devices to alter the phase of electricity at a point in the power distribution system.

However, the correct mechanism(s) should be enabled and at the correct time and for the correct duration in order to reduce system instability. One method that has been found to aid in prediction of system instability is to calculate the center of inertia of the system. The center of inertia is defined by the equation $$\delta_C = \frac{\sum_{i=1}^{N} \delta_j^i P_j^i}{\sum_{j=1}^{N} P_j^i},$$

where $\delta_c$ is the center of inertia, $\delta_j^i$ is the internal generator rotor angle of j generator in area i, and $P_j^i$ is the power generated by j generator in area i, and N is the number of generators in area i. The internal generator rotor angle is generally estimated to be similar to the phase of the electricity that the generator outputs which is sampled by a device known as a PMU (Phase Measurement Unit). However, enhanced PMUs have recently been developed and are known as synchrophasors.

A synchrophasor is a device attached to the power distribution system that senses amplitude, frequency, and phase information of electricity flowing through the power distribution system where the synchrophasor is located. This information together is generally represented by a phasor. The information can then be relayed to a remote site for further analysis. Additionally, the synchrophasors are synchronized to a common clock such that the phasor information can be related to the time at which the information was sensed. The common clocking of the synchrophasors further enables phase differences throughout the power distribution system to be more precisely ascertained. However, algorithms to efficiently use this information are still under development and different manufacturers of synchrophasors can have different tolerances or standards. Therefore, synchrophasors are a step in the right direction, but do not always provide consistent and therefore useable information.

The center of inertia is useful in estimating the phase of electricity within all or a portion of a power distribution system. Differences between centers of inertia between two areas of the power distribution system or between the whole power distribution system and a portion of the power distribution system are indicative of instability within the system. Although the center of inertia equation is relatively simple, it must be understood that its application to a modern power distribution system is difficult. A modern power distribution system is in constant fluctuation due to changes in supply, demand, and faults that occur within the system. Additionally, various interconnections between different power distribution systems can exist and/or be switched on or off adding even more complexity to the calculation. Instability in the system can lead to power loss due to system component failures or overcompensation via corrective actions.

It is desirable for the center of inertia to be computed in a relatively short interval for it to be useful for detecting—and even more so for correcting—instabilities within a power distribution system. Currently used calculations for the center of inertia rely on phase information from disparate synchrophasors to be aggregated by a central processor for calculation of the center of inertia. The total time to calculate the center of inertia includes the time to transmit the phase information in addition to the time required to calculate the center of inertia. Response to detected instabilities also requires additional time in order to command active component(s) of the system to correct the instability. Systems using such a topology are therefore not ideal for the detection and reacting to instabilities within a power distribution system.

Therefore, improving the instability detecting and correcting mechanisms used in power distribution systems is of utmost importance to deliver consistent power to consumers and to prevent damage to the power infrastructure. Thus, there is a need for improvement in this field.

SUMMARY

Disclosed are methods and apparatus for improving the stability of power distribution systems by decreasing the detection and reaction times associated with disturbances within the power distribution system that can cause instability. The method for ascertaining the stability of a power distribution system comprises calculating the center of inertia of a power distribution, sampling a phasor representing the properties of electricity flowing into, out of, or through a segment of the power distribution system using a tertiary sampling device, and using an edge data processor that is communicatively coupled to the tertiary sampling device to compare data extracted from the phasor to the center of inertia to ascertain the instability between the electricity sampled by the tertiary sampling device and the rest of the power distribution system.

The calculation of the center of inertia is performed remotely from the edge data processor. An edge data processor is defined herein as a data processor that is located at least 10 miles from the location at which the center of inertia is calculated and less than one mile from the location of the tertiary sampling device, typically a synchrophasor, and in those cases where the system also includes a responsive switch device, typically a relay, the edge data process is within one mile of such switch device. Ideally, instead of the one mile limitations, the distances from the edge data processor to the tertiary sampling device and responsive switch device are less than 100 meters. For the system as a whole, the calculation of the center of intertia is performed at least 10 miles away from at least 5 edge data processors, and more preferably it is performed at least 20 miles away from at least 10 edge data processors.

The edge data processors can periodically receive center of inertia information from, for example, a central data processor. The edge data processor can further predict future values of the data extracted from the phasor and compares the future values with the center of inertia or a predicted future center of inertia. The edge data processor can be configured to detect instabilities when the phase angle of electricity sampled by the tertiary sampling device has a phase angle that is greater than five, ten, or thirty degrees compared to the phase angle of the center of inertia and control an active component to alter the phase of electricity sampled by the tertiary sampling device. The active component can further be controlled automatically when an instability is detected. Advantageously, the active component is commanded within eight hundred, five hundred, or three hundred milliseconds of the existence of an instability between the electricity sampled by the tertiary sampling device and the center of inertia The active component can be commanded to return to its pre-instability detected state when the phase angle of electricity sampled by the tertiary sampling device has a phase angle that is less than five or three degrees compared to the phase angle of the center of inertia.

The center of inertia can be calculated through the use of a plurality of synchrophasors configured to measure phasor information representing properties of electricity at multiple locations within the power distribution system. At least two of the synchrophasors can be configured to measure phasor information pertaining to one electrical generator when calculating the center of inertia.

The calculation of the center of inertia can performed at least ten miles remote to the tertiary sampling device. The tertiary sampling device can be located within one mile of the active device. The tertiary sampling device can be configured to sample phasor data at least forty times per second. Error correcting algorithm can optionally be used on sampled phasor data.

Additionally disclosed is a system for ascertaining the stability of a power distribution system, comprising a plurality of sampling devices each configured to sample phasor information at a plurality of locations within a power distribution system wherein each phasor represents properties of electricity flowing through different portions of the power distribution system, a central data processor for calculating a center of inertia of the power distribution system using data from the plurality of sampling devices, and five or more edge data processors each communicatively coupled to a tertiary sampling device that is configured to sample phasor information of electricity flowing through, into, or out of the power distribution system. The edge data processors can be configured to receive center of inertia information from the central data processor and compare the phasor information from the tertiary sampling device to the center of inertia information to ascertain the stability between the electricity sampled by the tertiary sampling device and the rest of the power distribution system.

DESCRIPTION OF THE SELECTED EMBODIMENTS

Figure 1:
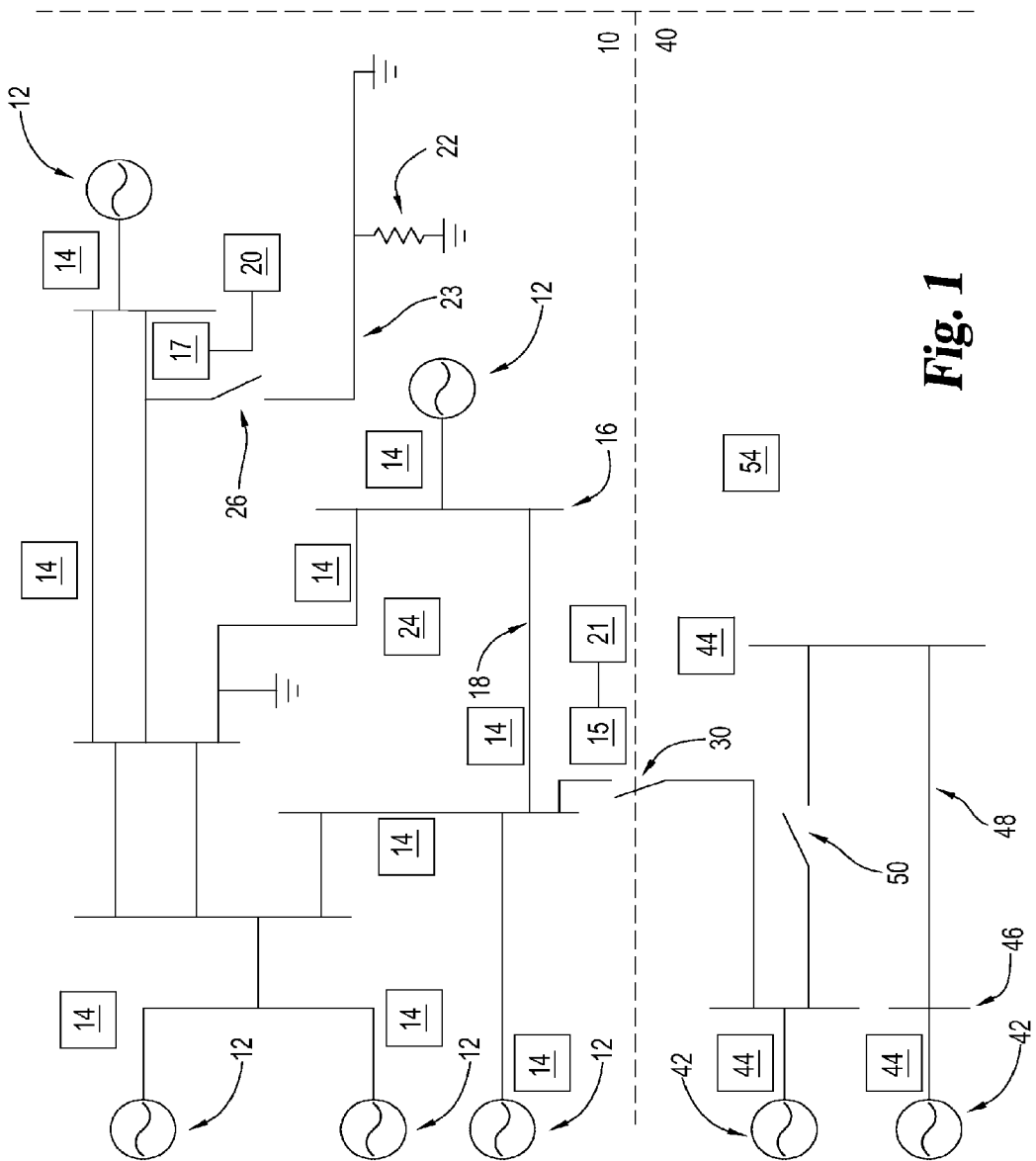
FIG. 1 is a diagram of an exemplar power distribution system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in detail, although it will be apparent to those skilled in the relevant art that some features that are not relevant to the present invention may not be shown for the sake of clarity.

FIG. 1 illustrates an example power distribution system. Specifically, illustrated is a first power distribution system 10 and a second power distribution system 40 that can be interconnected via interconnection switching station 30. As used herein, power distribution systems can include power generators, power transmission lines, substations, and other components consistent with the generation, transmission, distribution, and control of electric power.

The first power distribution system contains multiple power generators 12 which are interconnected through various transmission lines 18 and power busses 16. Power distribution systems are generally an order of magnitude more complex than this example diagram and can include many transformers and other substations throughout the system. Higher voltage lines are generally used in primary conduits as they can conduct power with less loss compared to lower voltage lines. These lines are then stepped down to lower voltages to service smaller areas for safety and other concerns. Additionally, three phases of power are generally used for power transmission and can be split into three separate one phase circuits for common residential power delivery, for example.

The power distribution systems also include synchrophasors 14, 15, and 17 for power distribution system 10 and synchrophasors 44 for power distribution system 40. The synchrophasors are sampling devices that provide valuable insight as to amplitude, frequency and phase information about the voltage and current being sampled. The synchrophasors can be used to generate phasors that represent sampled electricity parameters. This information from several locations can be used to detect and predict system instability, especially when used in conjunction with center of inertia information as a point of reference.

The center of inertia can be used at each location as a baseline reference for ascertaining system stability. It has been found that the relative instability between the power distribution system and electricity flowing through a portion of the power distribution system can be estimated by comparing the differences of phase angles between the electricity of the segment and the center of inertia of the distribution system. Generally, as the difference in phase angle increases, so does the instability.

Instabilities in the power distribution system can be caused by multiple factors. A common contributor to system instability is the occurrence of a fault in the power distribution system such as a shorted transmission wire. A fault can cause an excess current draw which consequently trips a circuit breaker within the distribution system. When a breaker is tripped (opened), the distribution system has a different configuration than when the breaker was closed. Therefore, it is generally desirable that the breaker be reclosed as quickly as possible in order to avoid instabilities caused by this unexpected change in configuration. This process is known as clearing the fault. It has been found that a one second interval from the existence of the fault and its clearing is desirable to avoid system instability.

In FIG. 1, a load 22 is illustrated to represent a user that can be in the form of a residential household or a commercial entity. The load can also represent a plurality of different users, different types of users, or other electrical loads. Power transmission line 23 provides power from the power distribution system 10 to the load 22. If a fault occurs within the load 22, a switching station/breaker 26 may open the transmission line 23 in order to isolate the load 22 from the rest of the power distribution system 10. The fault and the accompanying opening of the breaker 26 can alter the phase of electricity causing a ripple effect of instability through the power distribution system 10. In such an instance, it is preferable that the fault be cleared as quickly as possible to avoid the power distribution system 10 from becoming more unstable. Clearing the fault, assuming that its initial cause was transitory, can be accomplished by closing the switching station/breaker 26 to restore power to load 22.

Alternatively, sometimes it is beneficial to perform load shedding that can be accomplished by purposefully commanding the switching station 26 to open and isolate the transmission line 23 from the rest of the power distribution system 10. This type of "controlled blackout" can also be used to restore stability to the power distribution system 10 in certain instances. The switching station/breaker 26 can further be activated to provide power to other elements not shown, such as a capacitor, inductor, shed reactor, phase shifting transformer, or any combination of the previous to alter the phase of electricity flowing through a portion of the power distribution system.

A tertiary synchrophasor 17 samples electricity flowing through the switching station/breaker 26 and the load 22. This tertiary synchrophasor 17 can communicate with an edge data processor 20 that is configured to compare phase or other data pertaining to the electricity flowing through the load 22. The edge data processor 20 can then compare this data with the center of inertia. For example, central data processor 24 can be used to calculate the center of inertia of the power distribution system 10. In this manner, the tertiary synchrophasor 17 is remotely located from the device that calculates the center of inertia. The system of the invention will have many of these synchrophasors 17 located remotely from the location where the center of inertia is calculated, as detailed in the summary of the invention.

By processing the information at the edge of the power distribution system 10, the detection and reaction times for instabilities within the system can be greatly decreased. By decreasing these times, the stability of the power distribution system can be greatly increased leading to fewer cascade and other failures, fewer blackouts, fewer load sheds, and less stress on system components.

Additionally, the edge processing for the instability detection avoids pitfalls that can be associated with a centrally controlled system. In a centrally controlled system where, for example, the central data processor 24 controls fault clearing, there is time associated with the transmission and processing of the phasor information from the plurality of synchrophasors 14 to calculate the center of inertia, detecting a difference at a remote synchrophasor, and activating a remote active component to clear a fault or otherwise alter the phase of electricity within the distribution system to increase stability. The delay can be further compounded depending upon the reliability, bandwidth and speed of the transmission means used to transmit data between data processor(s) and synchrophasors and active components. It is common for Radio Frequency (RF) transmissions to be used for communication. These RF transmissions can be disrupted by other RF transmitters and/or natural phenomenon such as lightning. Furthermore, storms that produce lightning can predicate damage to the power distribution system and therefore compound the problem of timely responding to these instabilities.

It has also been found that the center of inertia can be periodically transmitted by a central data processor 24 to the edge data processor 20. The center of inertia, depending on the number of sampling devices, can be relatively stable by its nature and not fluctuate greatly from individual disturbances/instabilities within the power distribution system. Therefore, the edge data processor 20 need not have a continuous communication link with the central data processor 24 and can act semi or fully autonomously in order to clear faults and otherwise improve the stability of the power distribution system. The edge data processor 20 can also be updated periodically with different criteria for assessing the instability of the power distribution system.

The edge data processor 20 can optionally predict future values of phasor data. These predicted values can be calculated using Taylor series or other convergence algorithms. Additionally, the phasor data can be processed using an error correction algorithm such as least squares or fuzzy logic. Similarly, the center of inertia data can be predicted or error corrected. The predicted values can then be compared in order to more accurately detect and react to phenomenon that can cause system instability.

FIG. 1 includes a second power distribution system 40 having its own power generators 42, power buses 46, transmission lines 48, a central data processor 54 obtaining data from remote locations within said second system 40, and a switching station 50. The inclusion of the second power distribution system 40 is meant to illustrate that a power distribution system and its associated center of inertia can arbitrarily be chosen. Additionally, the figure illustrates, as is a common occurrence, that two or more power distribution systems can be connected to transfer power there between. When the power distribution systems are connected, such as through switch 30, any difference in phase between them indicates that there will be instability between the two systems when they are connected.

A synchrophasor 15 and corresponding edge processor 21 can be included at the intersection between two different power distribution systems to detect and correct instabilities between the systems. Furthermore, the summation of power distribution system 10 and power distribution system 40 can be considered a singular larger power distribution system and a corresponding center of inertia calculated from all of the remote locations of the two systems.

Figure 2A:
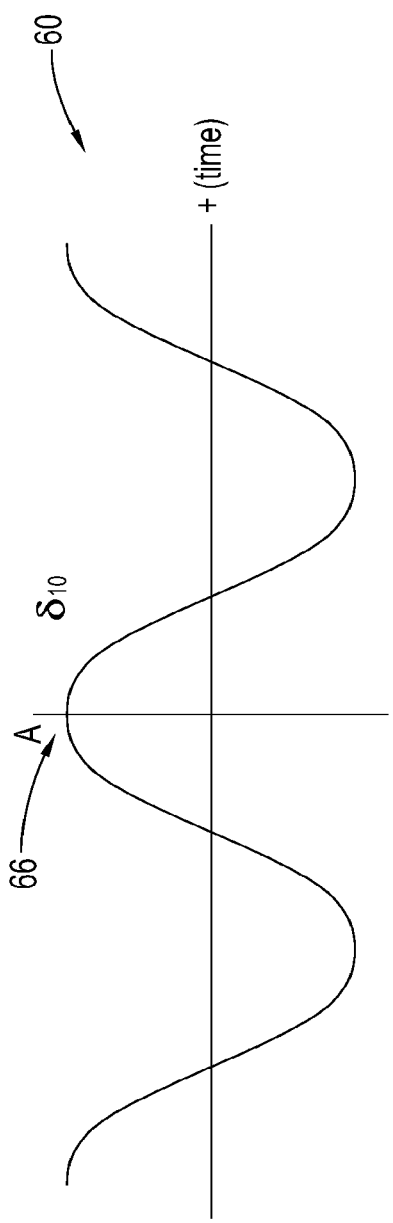
FIG. 2a is a graph illustrating representation of the power flowing in the power distribution system 10 portion of FIG. 1, as represented by its center of inertia.
Figure 2B:
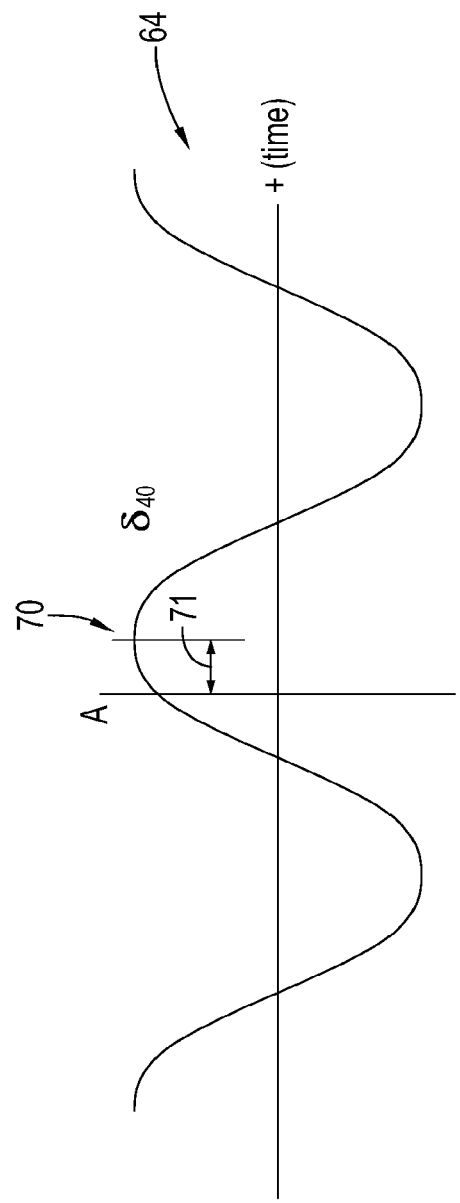
FIG. 2b is a graph illustrating representation of the power flowing in the power distribution system 40 portion of FIG. 1, as represented by its center of inertia.

FIGS. 2a-b illustrate examples of the power flowing through the power distribution systems illustrated in FIG. 1. It should be noted that these are simplified diagrams for ease of understanding and therefore only show a notional single phase in each power distribution system, when in practice the systems will be three phase. In FIG. 2a, graph 60 illustrates a possible representation of the power flowing in the power distribution system 10 as represented by its center of inertia. Conversely, in FIG. 2b, graph 64 shows representation of the power flowing through a separate power distribution system 40. Graph 60 and graph 64 are out of phase indicating that there is instability between the two systems, if they were combined through switching station 30. Since the two are out of phase, the interconnection between the two results in a potential difference between the two and leads to instability. Points 66 and 70 represent equivalent points on graphs 60 and 64 respectively. These points indicate the apex of a central crest. Since point 70 occurs at a different time compared to point 66, graph 64 is out of phase with graphs 60. This phase difference is designated 71.

Figure 3:
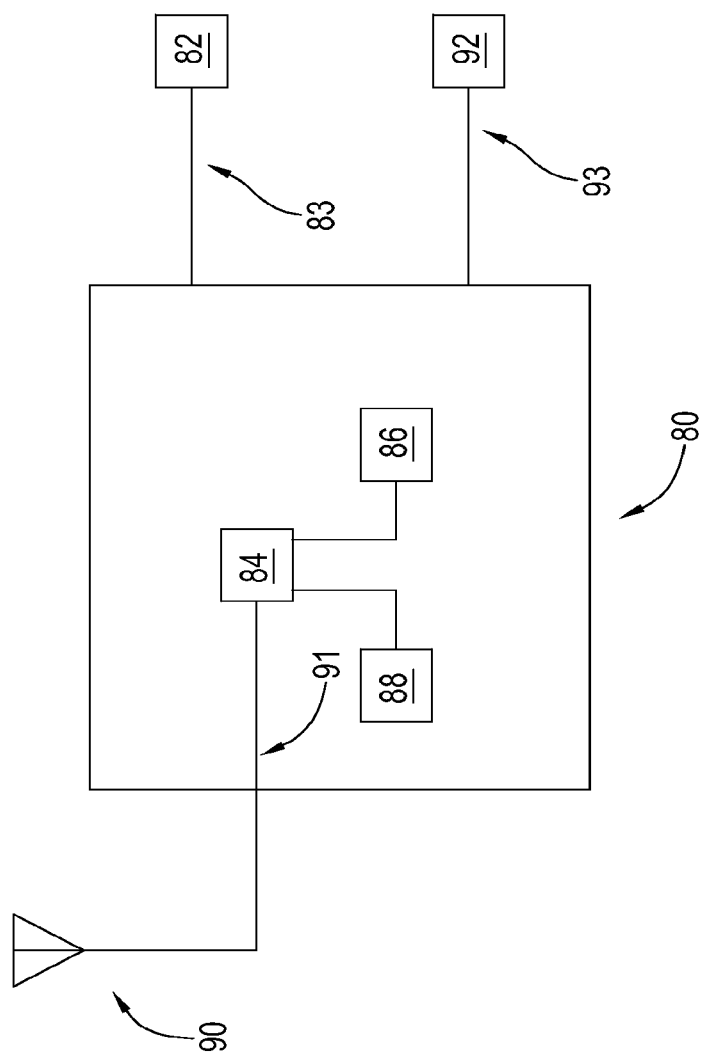
FIG. 3 is a diagram of an edge data processor illustrated in FIG. 1

FIG. 3 illustrates an edge data processor 80. The edge data processor 80 can include a communication channel 83 to a synchrophasor 82. Additionally, the edge data processor 80 can include a control channel 93 to an active device 92 of a power distribution system to change the phase angle of electricity within the power distribution system, such as by switching interconnections or loads. A communication channel 91 can also be used to communicate with a data processor for retrieving, as an example, center of inertia data. The illustration shows an antenna 90 to illustrate an RF data link. However multiple types and protocols of data links can be used. For example, a hardline connection, a line of sight microwave or optical transmission system, or superimposing the data with the power transmission lines in carrier current manner are all contemplated for use with the edge data processor 80.

The edge data processor 80 can include a processor 84. The processor can alternatively be an FPGA, ASIC, CPLD, or like device. Advantageously, these classes of device can process information relatively quickly and are less susceptible to bit flip and other phenomena associated with proximity to high power transmission lines. The image for configuring the FPGA or like device can be stored in external memory 86 or internal to the FPGA-like device itself. Alternatively, the memory can include a software program if the processor 84 is a microprocessor, microcontroller, or has an imbedded core for software processing. Similarly, the information retrieved via the communication channel 91 can be stored in memory 88. The edge data processor 80 can include combinations of microprocessor and FPGA type devices, some of which may be configured to process and store information from the communication channel 91 and some for processing information to or from the synchrophasor 82 or active device 92.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method for ascertaining the stability of a power distribution system, comprising:
   a. calculating the center of inertia of a power distribution at a first location,
   b. sampling a phasor representing the properties of electricity flowing into, out of, or through a segment of said power distribution system using five tertiary sampling devices located at least 10 miles from said first location, and
   c. using five edge data processors located at least 10 miles from said first location with each of said edge data processors being communicatively coupled to a respective one of said tertiary sampling devices to compare data extracted from said phasor to said center of inertia to ascertain the instability between said electricity sampled by said tertiary sampling device and the rest of said power distribution system;
   wherein said calculation of said center of inertia is performed at least 10 miles from said edge data processor.

2. The method of claim 1 wherein said edge data processors each periodically receives center of inertia information from the central data processor.

3. The method of claim 1 wherein each of said edge data processors further predicts future values of said data extracted from said phasor and compares said future values with said center of inertia or a predicted future center of inertia.

4. The method of claim 1 additionally comprising control of an active component to alter the phase of electricity sampled by said tertiary sampling device when an instability is detected by one of said edge data processors.

5. The method of claim 4 wherein said active component is controlled automatically when an instability is detected.

6. The method of claim 5 wherein said active component is commanded within eight hundred milliseconds of the existence of an instability between the electricity sampled by said tertiary sampling device and the center of inertia.

7. The method of claim 6 wherein said active component is commanded within five hundred milliseconds of the existence of an instability between the electricity sampled by said tertiary sampling device and the center of inertia.

8. The method of claim 7 wherein said active component is commanded within three hundred milliseconds of the existence of an instability between the electricity sampled by said tertiary sampling device and the center of inertia.

9. The method of claim 5 wherein said active component is commanded to return to its pre-instability detected state when the phase angle of electricity sampled by said tertiary sampling device has a phase angle that is less than five degrees compared to the phase angle of said center of inertia.

10. The method of claim 9 wherein said active component is commanded to return to its pre-instability detected state when the phase angle of electricity sampled by said tertiary sampling device has a phase angle that is less than two degrees compared to the phase angle of said center of inertia.

11. The method of claim 10 wherein said center of inertia is calculated through the use of a plurality of synchrophasors configured to measure phasor information representing properties of electricity at multiple locations within said power distribution system.

12. The method of claim 11 wherein at least two of said synchrophasors measures phasor information pertaining to one electrical generator when calculating said center of inertia.

13. The method of claim 12 wherein said calculation of said center of inertia is performed at least ten miles remote to said tertiary sampling device.

14. The method of claim 4 wherein one of said tertiary sampling devices is located within one mile of said active device.

15. The method of claim 1 wherein said tertiary sampling device is configured to sample phasor data at least forty times per second.

16. The method of claim 15 further comprising utilizing an error correcting algorithm on sampled phasor data.

17. A system for ascertaining the stability of a power distribution system, comprising:
   a. a plurality of sampling devices each configured to sample phasor information at a plurality of locations within a power distribution system wherein each phasor represents properties of electricity flowing through different portions of said power distribution system,
   b. a central data processor for calculating a center of inertia of the power distribution system using data from said plurality of sampling devices, and
   c. at least 5 edge data processors at least 10 miles from said central data processor, with each of said edge data processors communicatively coupled to a tertiary sampling device that is configured to sample phasor information of electricity flowing through, into, or out of said power distribution system;
   wherein each of said edge data processors is configured to receive center of inertia information from said central data processor and compare said phasor information from said tertiary sampling device to said center of inertia information to ascertain the stability between the electricity sampled by said tertiary sampling device and the rest of the power distribution system.

18. The system of claim 17 in which there are 5 more edge data processors defined as the 5 that are referenced in claim 17 are defined.

* * * * *